United States Patent [19]
Chasek

[11] 3,774,113
[45] Nov. 20, 1973

[54] APPARATUS AND SYSTEMS FOR TESTING AND MONITORING RECEIVER EQUIPMENT, INCLUDING SYSTEM CAPABILITY FOR CONTINUOUS IN-SERVICE PERFORMANCE MONITORING

[75] Inventor: Norman E. Chasek, Stamford, Conn.

[73] Assignee: International Microwave Corporation, Cos Cob, Conn.

[22] Filed: July 29, 1970

[21] Appl. No.: 59,122

Related U.S. Application Data

[63] Continuation-in-part of Ser. No. 2,342, Jan. 12, 1970.

[52] U.S. Cl. .............................................. 325/363
[51] Int. Cl. ............................................ H04b 1/06
[58] Field of Search .................. 325/2, 31, 67, 363; 324/57 N

[56] References Cited
UNITED STATES PATENTS
3,271,679  9/1966  Fostoff................................. 325/31

OTHER PUBLICATIONS
Noise–Figure Measurements, Airborne Instruments Laboratory, pp. 12–14 (April, 1966)

*Primary Examiner*—Albert J. Mayer
*Attorney*—Bryan, Parmelee, Johnson & Bollinger

[57] ABSTRACT

Apparatus and systems for testing and monitoring receiver equipment providing automatic noise figure indication, and capable of continuous in-service performance monitoring. The automatic noise figure indicator has a logarithmic voltage-controlled attenuator with a fast-acting automatic gain control (AGC) feedback loop for keeping the attenuator output constant, with read out means connected to the AGC loop and responsive to its alternating voltage level for providing information on the noise figure. A white noise test source is gated on-and-off at predetermined frequency $F_1$; for continuous in-service performance monitoring this noise source is also modulated at higher frequency $F_2$ preferably at least ten times frequency $F_1$. In continuous monitoring this test noise is introduced at an energy level substantially below the receiver noise energy level, i.e., it is buried to avoid interference with normal receiver operation, and this buried test signal is later retrieved by a signal enhancing correlator. Receiver parameter monitoring occurs continuously while receivers are in-service without interfering with normal operation. Among the monitored parameters disclosed are gain tracking characteristics and phase/gain characteristics of companion receivers, antenna VSWR, amplitude non-linearity in a receiver, and R.F. gain and transmission flatness of equipment having the same input and output frequency. Prompt, accurate and direct information about receiver operational status is provided to the operator while equipment is actually in use; a higher average quality of performance can be maintained because degradation is immediately detectable and thus correctable. Also, potential failures can thereby be anticipated and "down time" reduced. Maintenance costs are reduced because service is done in pre-scheduled normal time.

23 Claims, 18 Drawing Figures

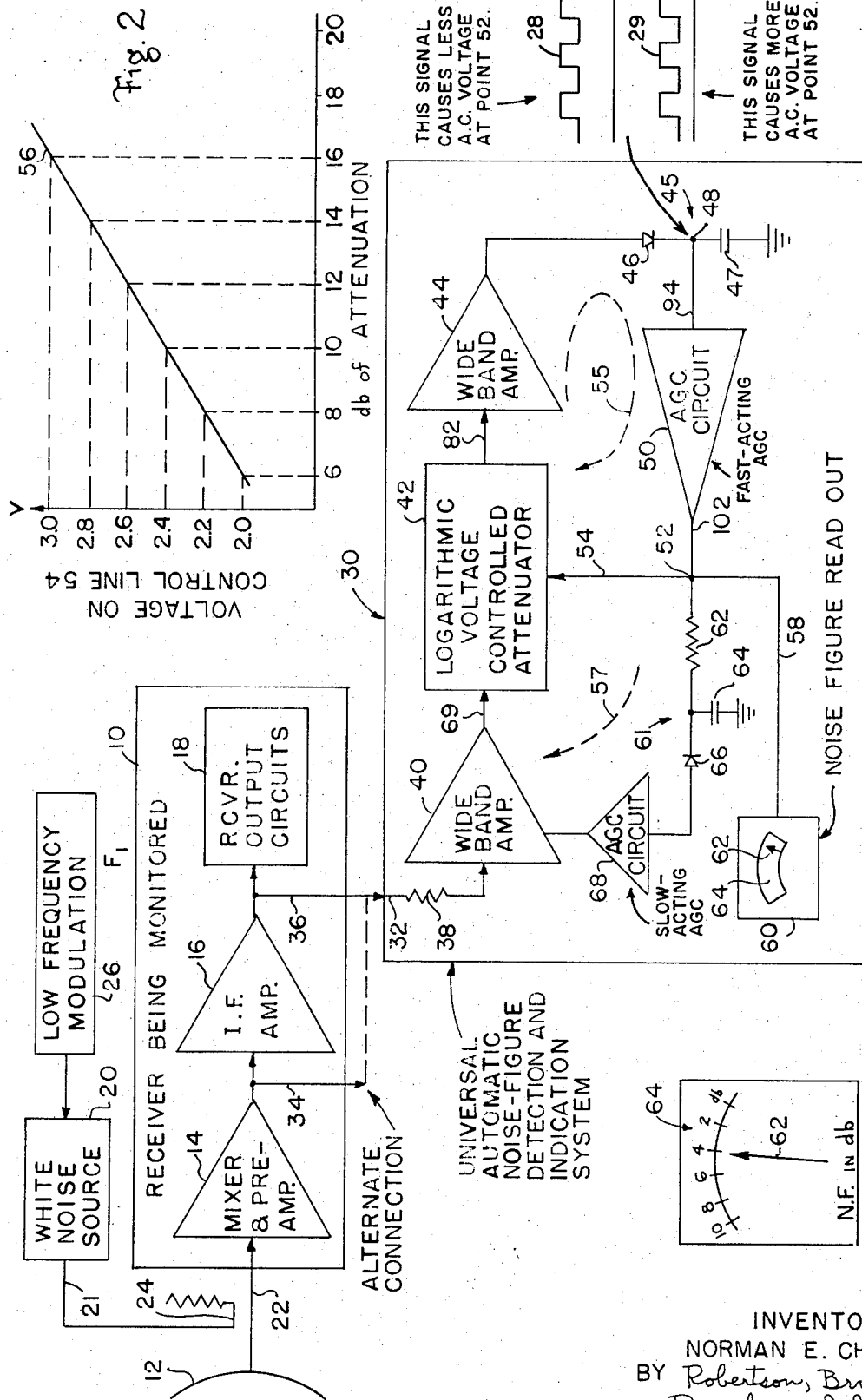

UNMODULATED NOISE SPECTRUM

MODULATION SPECTRUM

MODULATED NOISE SPECTRUM

3,774,113

APPARATUS AND SYSTEMS FOR TESTING AND MONITORING RECEIVER EQUIPMENT, INCLUDING SYSTEM CAPABILITY FOR CONTINUOUS IN-SERVICE PERFORMANCE MONITORING

RELATED U.S. APPLICATION DATA

This application is a continuation-in-part of prior copending application Ser. No. 002,342, filed Jan. 12, 1970.

Receiver parameter monitoring systems are disclosed for continuously monitoring the performance of receivers while they are in-service and without interference with the normal operation of the receivers. Among the parameters which are monitored are the gain tracking characteristics of a plurality of companion receivers, the phase/gain characteristics of a plurality of companion receivers, the antenna VSWR in an antenna and receiver installation, the amplitude non-linearity in a receiver, and the R.F. gain and trans-mission flatness of R.F. equipment having the same input and output frequency, such as a parametric amplifier. This monitoring system enables the operator to have prompt, accurate and direct information about the operational status of the receiver equipment while the equipment is actually in use and as a result a higher average quality or level of performance can be maintained because any degradation in performance is immediately detected and can be corrected. Also, the operator is enabled to anticipate potential failures, and in this way the "down time" of the monitored equipment is reduced. Maintenance costs are reduced because the service is carried out in pre-scheduled normal working time rather than after the failure has occurred, which may be at night or over a week-end.

DESCRIPTION

The present invention relates to apparatus and systems for testing and monitoring microwave receiver equipment, automatically providing an accurate indication of the receiver noise figure. This invention, in certain of its aspects, provides capability for continuous in-service performance monitoring, and in certain of its other aspects provides capability of "on line" testing of receiver equipment.

The present invention also relates to receiver parameter monitoring systems for on-line monitoring. More particularly, the invention relates to the on-line monitoring of the gain tracking characteristics of a plurality of receivers, of the phase/gain tracking characteristics of a plurality of receivers, of the antenna voltage standing wave ratio in an antenna and receiver installation, of the amplitude non-linearity in a receiver, and of the R.F. gain and transmission flatness of any R.F. device or system which has the same input and output frequency, such as a parametric amplifier as used in the front ends of microwave receivers for receiving faint signals from deep space probes and the like.

It is my belief that in addition to monitoring the noise figure of a receiver system, it is important to monitor certain key parameters of receiver installations on an on-line or in-service basis. The reason for this belief is that such monitoring enables the operator or person in charge of the receiver installation to have prompt, accurate, direct information about the status of the system. This prompt, accurate, direct information will enable the operator to make adjustments or corrections such that an overall higher average quality or level of performance can be maintained. Moreover, the operator is enabled to anticipate potential failures, and in this way the "down time" of the receiver installation is reduced. Also, the cost of maintenance is reduced because the maintenance personnel can attend to potential failures on a pre-scheduled, normal working time basis, rather than being called upon to make expensive repairs after failure has occurred at night time or over a week-end.

Among the many advantages of the present invention are those resulting from the fact that white noise is used as the testing medium thus enabling a more accurate determination of the receiver test noise because it is a comparison of noise to noise, i.e. of-like-to-like phenomena.

Moreover, by employing white noise the test results on the receiver equipment are accurately obtained independent of the band characteristics and band shape of the receiver because the nature of the test noise and the receiver noise are the same. Thus, their ratios remain unimpaired in spite of the particular band characteristics of the receiver and hence an accurate determination of the receiver figure is provided.

A further advantage is that an automatic noise figure indication is provided by test apparatus including a logarithmic voltage controlled attenuator with a fast-acting automatic gain control feedback loop which is connected to the attenuator for keeping the attenuator output constant. Read-out means are connected to the feedback loop and are responsive to the level of the alternating voltage in the feedback loop for providing information as to the receiver noise figure.

In-service performance monitoring systems have the advantages that the test noise is introduced at an energy level substantially below the receiver noise energy level, i.e. the test noise is "buried," so as not to interfere with the normal operation of the receiver, and the buried test signal is later retrieved by a signal enhancing correlator.

Among other advantages of the present invention are those resulting from the fact that it enables certain key parameters of microwave receiver installations to be monitored on an on-line and in-service basis. This invention enables such on-line monitoring to be accomplished in a wide variety of receiver installations. In the illustrative embodiments of the invention, as shown, it enables the gain tracking characteristics of a plurality of receivers, and the phase/gain tracking characteristics of a plurality of receivers to be monitored. Also, it enables the monitoring on an on-line basis of the antenna voltage standing wave ratio of an antenna and receiver installation, the amplitude non-linearity in a receiver, and the radio frequency (R.F.) gain and transmission flatness of R.F. devices or systems having the same input and output frequency, such as parametric amplifiers as are used in the front ends of microwave receivers.

Among the further advantages of the present invention are those resulting from the fact that it enables continuous in-service performance monitoring to be performed. The test signals which are injected into the equipment being monitored are submerged below the noise which is normally present in the receiver installations so that the test signals do not interfere with the normal operation and functioning of the communication equipment.

The various features, aspects and advantages of the parameter monitoring apparatus and systems embodying the present invention will be more fully understood from a consideration of the following detailed description in conjunction with the accompanying drawings, showing various illustrative embodiments of the invention, and in which:

FIG. 1 is a schematic circuit diagram showing universal automatic noise-figure testing apparatus being used on line to test a microwave receiver;

FIG. 2 is a plot of the decibels of attenuation as a function of control voltage for the logarithmic voltage controlled attenuator which is included in the automatic noise-figure testing apparatus of FIG. 1;

FIG. 3 shows the inverted scale face of the noise figure read out meter which is included in the automatic noise-figure testing apparatus of FIG. 1;

FIG. 2 is a schematic circuit diagram of a logarithmic voltage controlled attenuator which may be employed in the circuit of FIG. 1;

Figure 4A:
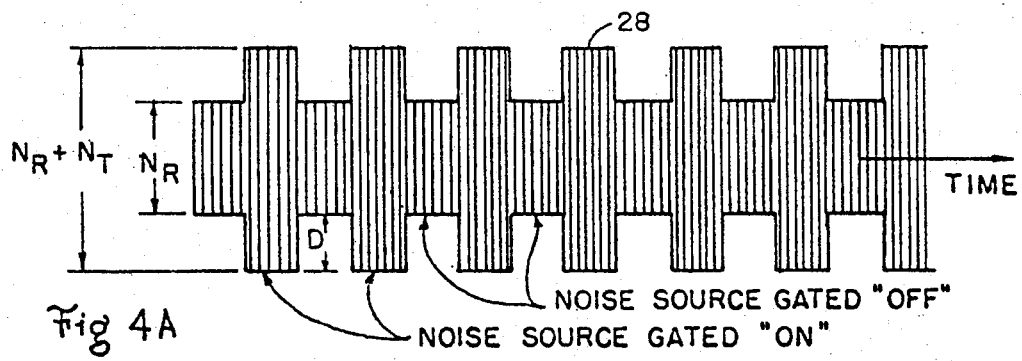
FIGS. 4A and 4B are plots of the signal present when the receiver has a higher noise energy level (FIG. 4A) or when it has a smaller noise energy level (FIG. 4B)

Referring to the drawings in greater detail, in the system of FIG. 1 there is a microwave receiver 10 whose noise figure is being monitored by monitoring equipment capable of being used "on line."

The receiver 10 may be any type or kind of microwave receiver, either AM or FM, and the receiver may be adapted to be utilized for any purpose of function. As explained previously, it is among the advantages of the present invention that it can be applied to all types and kinds of microwave receivers being used for any purpose or function and can be employed "on line."

The receiver 10 is connected to a microwave antenna 12 and includes mixer and pre-amplifier circuits 14 feeding the intermediate frequency (I.F.) amplifier stages 16 which are coupled to the receiver output circuits 18.

In order to monitor the noise figure of the receiver 10, a white noise source 20 has its output connection 21 coupled into the input connection 22 of the receiver by a unidirectional microwave coupler 24. The noise source 20 is modulated by a low frequency modulation control 26 which serves to cyclically turn on and off the white noise signal supplied to the output connection 21 of the noise source 20. Any suitable low frequency modulation may be used, and in this illustrative embodiment the low frequency being used is for example, 100 Hertz.

The low frequency modulation control 26 serves to gate, i.e. to chop the noise source 20 on and off, producing a cyclic increase and decrease of a predetermined amount in the energy level of the generated noise signal being supplied by the connection 21 to the coupler 24.

The noise figure of the receiver 10 can be monitored (1) during periods of time when no information is being received by the antenna 12.

Figure 4B:
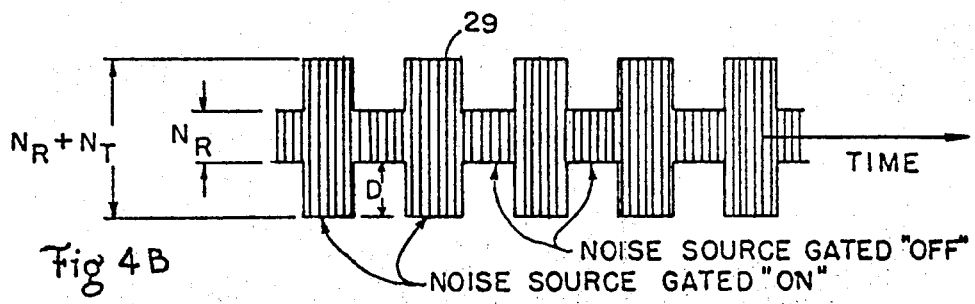

Assuming that a period of time is occurring when no information is being received by the antenna, then the gating of the noise source 20 "on" and "off" normally produces a noise signal voltage pattern such as shown in FIG. 4A or 4B occurring in the receiver 10 at the output connection 34 from the mixer-preamplifier and also at the output connection 36 from the I.F. amplifier.

The noise signal voltage pattern 28 or 29 is the envelope of the total noise signal. During the cyclically occurring moments when the noise source 20 is gated "on," the noise signal voltage envelope 28 or 29 is larger, because the noise signal voltage from the source 20 is added as an increment D to the receiver noise voltage which is present. This is shown as $N_R + N_T$, where $N_R$ is the receiver noise and $N_T$ is the test noise.

During the intervening moments when the noise source 20 is gated "off," the envelope 28 or 29 is smaller because it results from the receiver noise ($N_R$) alone. The noise figure is the ratio of the receiver noise ($N_R$) divided by the noise from a matched resistor at room temperature plus one.

This is expressed as follows:

Noise Figure $= (N_R/N_{Res}) + 1$ where $N_{Res}$ is the noise of a matched resistor at room temperature.

Also, the receiver noise figure can be expressed as a meter reading, M:

$$M = (N_T/N_F)$$

where $N_T$ is the test noise as a numeric value equal to the ratio of its output noise compared to a matched resistor at room temperature.

With respect to FIGS. 4A and 4B, it is noted that when the noise of the receiver ($N_R$) is smaller, as in FIG. 4B, then the proportional change in the envelope pattern 29 becomes greater than in envelope 28, because the differential D which is contributed by the test noise ($N_T$) from the source 20, remains constant.

The universal automatic noise figure detection and indication system 30 has an input connection 32 which is tapped into the receiver 10 at either of two convenient connection places, 34 or 36, namely before or after the I.F. amplifier stages 16. The input connection 32 is shown as including an isolating resistor 38 leading into a wide band amplifier 40. The band width of the amplifier 40 is sufficiently broad to cover the range of the receiver I.F. frequencies normally encountered.

Figure 5:
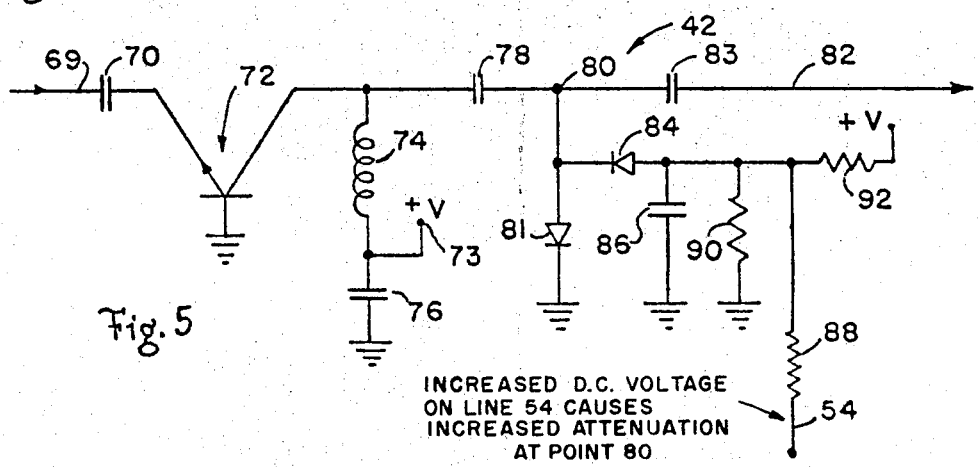
Figure 6:
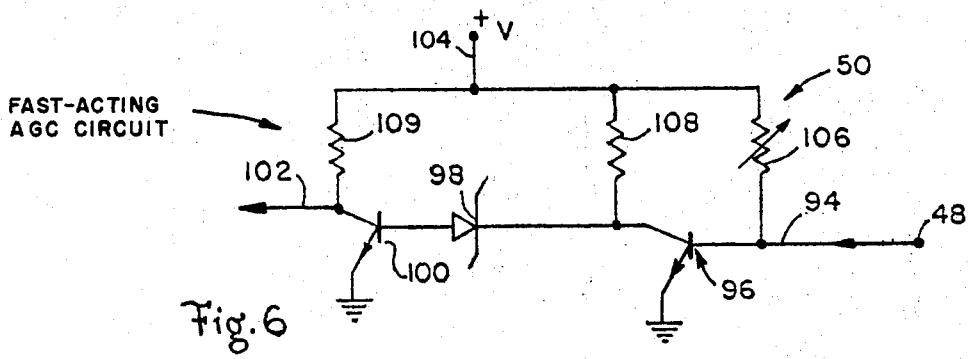
FIG. 6 is a schematic circuit diagram of a fast-acting A.G.C. circuit which may be employed in the circuit of FIG. 1.

This amplifier 40 feeds into a logarithmic voltage controlled attenuator circuit 42 of which a schematic circuit diagram is shown in FIG. 5. The attenuator 42 is connected into another wide-band amplifier 44, and its output is fed to a rectifier circuit 45 including a diode 46 and a capacitor 47. Thus, at the connection point 48 between the diode 46 and capacitor 47 there appears a fluctuating voltage which corresponds with the envelope 28 or 29 (FIG. 4A or 4B). The capacitor 47 has a sufficiently small capacitance that the fluctuating voltage at the point 48 can accurately follow this envelope 28 or 29 which has a square wave frequency corresponding with that of the low frequency modulation produced by the modulator 26. This fluctuating voltage from the point 48 is fed into a fast-acting automatic gain control (AGC) circuit 50 whose output is fed to a junction 52 connected through a voltage control line 54 into the logarithmic attenuator 42. This fast-acting AGC circuit has a sufficiently fast response that it instantaneously follows the voltage of the point 48. A schematic circuit diagram of the fast-acting AGC circuit 50 is shown in FIG. 5 and will be described in detail further below. The loop 55 is an instantaneously acting automatic gain control feedback loop.

This logarithmic voltage controlled attenuator 42 has an overall attenuation characteristic as shown in the plot of FIG. 2. As the applied voltage on the control line 54 is increased, the decibels of attenuation linearly increase, and vice versa, as indicated by the straight characteristic line 56.

The operation of the universal automatic noise-figure detection and indication system is as follows:

In the case of a receiver having a relatively larger noise, as shown by the envelope 28 in FIG. 4A, the direct current component of the voltage at the point 52 (and on control line 54) is higher on average, because the envelope 28 represents a greater noise signal strength. Therefore, the amount of decibels of attenuation is increased, as indicated by the characteristic line 56 in FIG. 2 when larger applied voltages are present on control line 54. Consequently, the alternating component of the voltage at the point 52 is small, because of the increased attenuation occurring in the attenuator 42. This small fluctuating voltage (A.C. component) at the point 52 is fed by a lead 58 to an alternating current (A.C.) voltmeter 60, and the small A.C. component causes the needle 62 (FIG. 3) to move toward the left of the scale 64.

As shown in FIG. 3, the meter 60 has an inverted scale 64. Thus, as the pointer 62 moves toward the left, it indicates that the receiver has a larger noise figure in decibels.

Conversely, in the case of a receiver having a relatively smaller noise, as shown by the envelope 29 in FIG. 4B, the D.C. component of the voltage at the point 52 (and on control line 54) is lower on average, because the envelope 29 represents a lesser noise signal strength. Therefore, the amount of decibels of attenuation is decreased, according to the characteristic line 56, for lesser applied voltages are present on control line 54. Consequently, fluctuation of the voltage at the point 52 is greater, because of the decreased attenuation occurring in the attenuator 42. This greater fluctuation of voltage at the point 52 causes the needle 62 of the A.C. voltmeter 60 to move to the right, and this gives an indication of a smaller noise figure as seen from the scale 64 in FIG. 3.

Moreover, in the operation, by virtue of the fact that the attenuation produced is logarithmic in characteristic, the result is that the reading given by the read out meter 60 is a true reading of the Noise Figure independent of the gain level of the receiver. As seen in FIG. 2, when the voltage on the control line 54 rises from 2.2 volts to 2.4 volts, the decibels of attenuation increase from, say, 8 to 10. Similarly, when the voltage on the control line 54 rises from 2.8 volts to 3.0 volts, the decibels of attenuation increase from, say, 14 to 16, which is the same increment as before. Therefore, the meter 60, which is calibrated in decibels will give a true reading of the noise figure, regardless of whether the receiver is operating at a high gain or a lower gain.

In order to make the system 30 operate completely automatically without human adjustment in spite of wide variations in the gain of the receiver under test or in spite of differences in gain between various channels being tested, there is a very slow-acting automatic gain control feedback loop 57. This slow-acting loop 57 includes the portion of the loop 55 as far as the junction 52 and then continues on back to the amplifier 40 through a feedback circuit which is about to be described. The phrase "slow acting AGC" means that the response is slow relative to the rate of gating of the low frequency modulator 26.

This slow-acting feedback circuit 57 includes a filter-rectifier circuit 61 including a resistor 62 and a filter capacitor 64 whose junction is coupled through a diode rectifier 66 into an AGC amplifier 68 which controls the gain of the wide band amplifier 40. This slow-acting AGC circuit 57 prevents receivers with very large gain or very low gain (i.e. extreme cases) from forcing the attenuator 42 to operate near the very ends of the characteristic 56 where undue non-linearity might occur. In other words, the slow acting AGC circuit 57 comes into play in extreme cases to enable the attenuator 42 to operate near the central portions of its characteristic 56.

Instead of using this slow acting AGC loop 57, the amplifier 40 may be provided with a manually adjustable gain control to be used in extreme cases.

As shown in FIG. 5, the logarithmic voltage controlled attenuator 42 includes an input 69 with a coupling capacitor 70 connected to the emitter of a NPN transistor 72 having its base electrode grounded and its collector energized from a voltage supply 73 through an isolating inductance 74 with a by-pass capacitor 76 to ground. The collector of the transistor 72 is coupled through a capacitor 78 to an attenuation point 80. This attenuation point is coupled to ground through a diode 81 and is coupled to the output 82 through a capacitor 83. Another diode 84 is connected between the point 80 and a grounded capacitor 86. The applied control voltage on the line 54 feeds through an isolating resistor 88 and across a resistor 90, with supply voltage being fed through a resistor 92.

Thus, as the voltage on the control line 54 increases, the attenuation produced at the point 80 by the interaction of the diodes 81 and 84 is increased, and vice versa.

The AGC circuit 50 has its input 94 connected to the base of a grounded-emitter NPN transistor 96 with its collector connected through a Zener diode 98 to the base of another grounded-emitter NPN transistor 100. The power supply voltage 104 feeds through an adjustable resistor 106 to the base of the transistor 96, through a resistor 108 to the collector of this same transistor. It also feeds through a resistor 109 to the collector of the transistor 100. The Zener diode 98 preserves D.C. coupling between input 48 and output 102 and acts as a reference or threshold for causing the AGC action to come into play.

In summary, the automatic system of FIGS. 1–6 can be employed to advantage to monitor any receiver, either AM or FM, while it remains in its "on line" installed condition.

Figure 7:
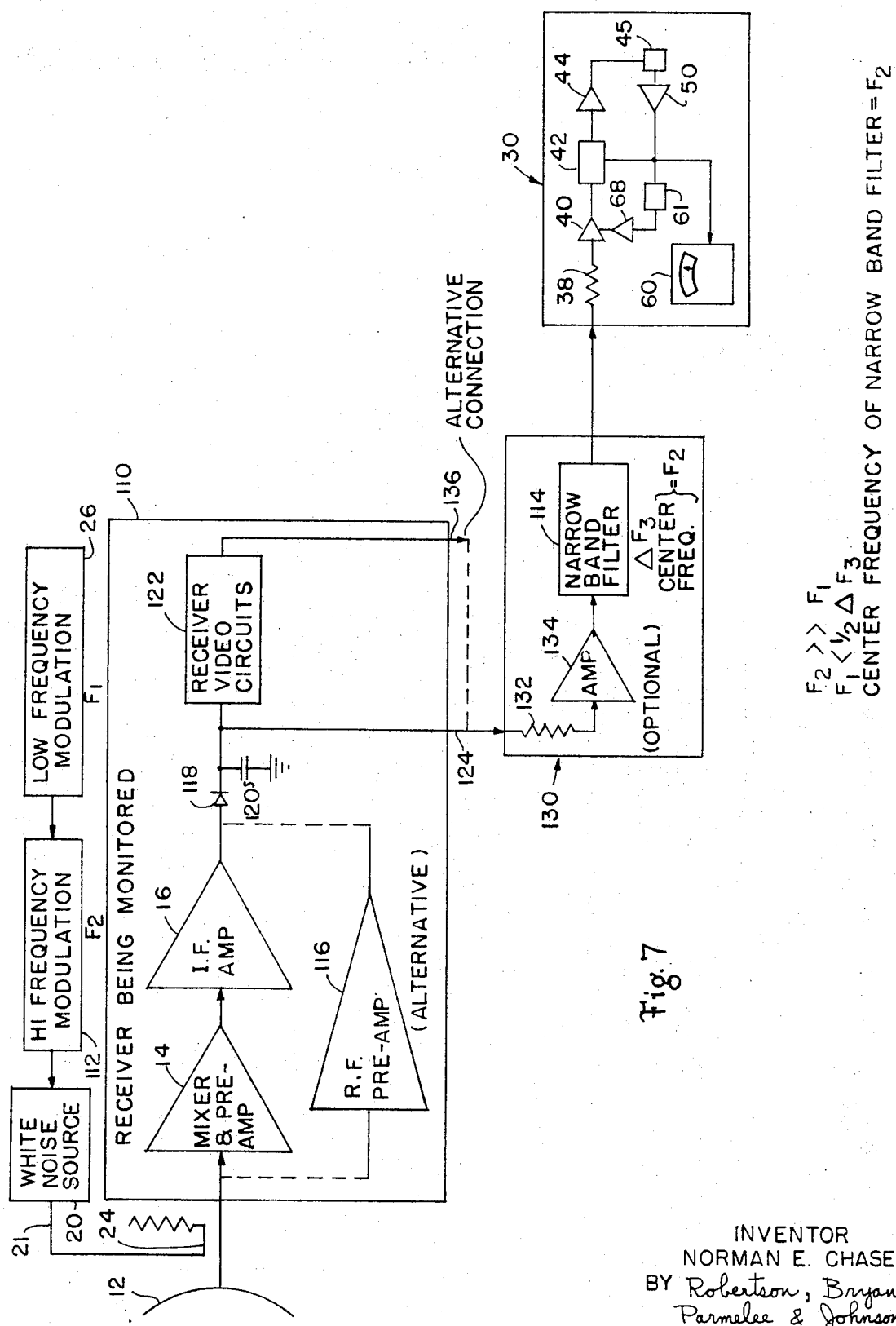
FIG. 7 is a schematic circuit diagram of a system for on line monitoring of the noise figure of a crystal video receiver or an AM receiver in which only the second detector output is conveniently accessible.

FIG. 7 shows a system for on-line monitoring of the noise figure of a receiver 110 using buried test noise. This system is similar to the system of FIGS. 1–6, described above, except that it is adapted for the following types of receivers: (1) crystal video receivers and (2) amplitude modulation (AM) receivers in which only the second detector output is conveniently accessible for making the test connections thereto. This test system may be used when the receiver 110 is actually in service, if the carrier signal being received is relatively weak.

In the system of FIG. 7, those elements performing functions corresponding to the similar elements of FIGS. 1–6 have corresponding reference numbers. The white noise source 20 is modulated by a high frequency modulator 112 operating at a suitable high frequency ($F_2$) for example, such as 1 megaHertz. The only limitations on the high frequency modulation ($F_2$) are: (1) $F_2$ should be substantially greater than the frequency ($F_1$) of the on-off chopping or gating provided by the low frequency modulator 26 and (2) $F_1$ should be less than one-half of the band width $\Delta F_3$ of the narrow band filter 114. For the most advantageous operation $F_2$ should be at least 10 times higher than $F_1$ for reasons as explained in detail further below.

The high frequency modulation $F_2$ may provide a cyclic on-off gating of the white noise or it may provide a cyclic increase and decrease of the intensity of the white noise. The low frequency gating $F_1$ may be any suitable low frequency, say, 100 Hertz.

The receiver 110 being monitored may include a radio frequency (R.F.) pre-amplifier 116 as an alternative to the mixer and pre-amplifier circuit 14 and the I.F. amplifier stages 16. The output from the I.F. amplifier stages 16 (or the output from the R.F. pre-amplifier 116) is detected by a crystal second detector stage 118 with a filter capacitor 120 feeding into the video circuits 122 of the receiver 110.

An output connection 124 after the second detector stage 118 leads into a filtering circuit 130 which serves the function of enabling the automatic noise figure monitoring to be carried out at the video frequency level, i.e. after the second detector. The filter circuit 130 includes an isolative in-feed resistor 132 and may include an amplifier stage 134. This amplifier stage 134 is optional, if there is sufficiently high gain in the receiver stages preceding the output connection 124, (sufficiently high gain is usually encountered in practice), then the amplifier stage 134 is not needed.

In the filter circuit 130 is included the narrow band filter 114, which has a band width $\Delta F_3$ at least twice $F_1$; for example with $F_1$ at 100 Hertz, then the band width of the filter 114 is, say 250 Hertz, and its center frequency is at the frequency $F_2$.

The output from the filter 114 is fed into the universal automatic noise figure detection and indication circuit 30 which includes the same components as in FIG. 1.

In the operation, the white noise acts as a random carrier signal which passes through the front end stages 14 and 16 (or 116) of the receiver 110. The detector stage 118 serves to detect and thus extract the high frequency modulation $F_2$ as a detected signal which passes through the filter 114.

In the automatic noise-figure detection and indication circuit 30 the rectifier state 45 serves to detect the low frequency modulation envelope which is the same as the envelope 28 or 29 in FIGS. 4A or 4B. Thus, the meter 60 provides an automatic reading of the noise figure of the receiver 110 in decibels.

In effect, the white noise modulated at the frequency $F_2$ has served as a random carrier, which may be called a psuedo carrier for carrying the low frequency $F_1$ information through the second detector stage 118.

As an alternative connection, the input 131 of the filter circuit 130 can be connected as indicated at 136 to the receiver video circuit 122.

Figure 8:
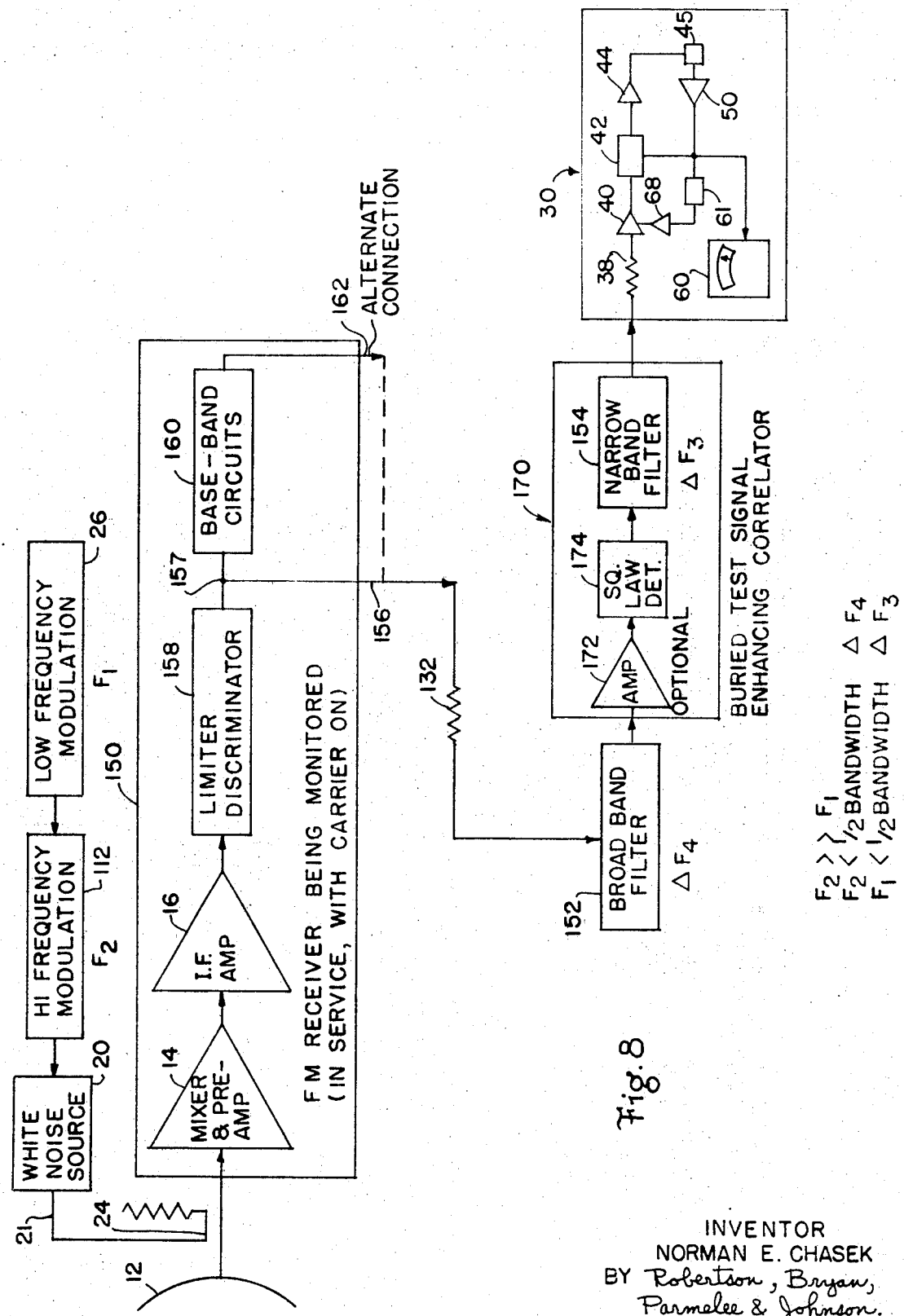
FIG. 8 shows a system for continuous monitoring of a receiver while it is in service with a received signal present in the receiver.

FIG. 8 shows a system for in-service monitoring of the noise figure of a frequency modulation (FM) receiver 150 using "buried" test noise. This buried test noise does not interfere with the intelligence being transmitted by the carrier which is present, because it is white noise which is completely random, and its energy level is so low as to be buried in the receiver noise. In the system of FIG. 8, those elements performing functions corresponding to the similar elements of FIGS. 1–7 have corresponding reference numbers.

The white noise source 20 is modulated by a high frequency modulator 112 operating at a suitable high frequency ($F_2$) for example such as 200 kilo-Hertz. The limitations on the high frequency modulation $F_2$ are: (1) $F_2$ should be substantially greater than $F_1$, for example $F_2$ should be at least 10 times $F_1$; and (2) $F_2$ should be less than one half the bandwidth $\Delta F_4$ of the broad band filter 152. Also, the frequency $F_1$ should be less than one-half of the bandwidth $\Delta F_3$ of the narrow band filter.

This broad band filter 152 is tuned to cover a range of frequencies within the pass band of the receiver 150 but spaced above the upper limit of the base band, assuming that this upper base-band limit is at 4.0 megaHertz, then the broad band filter may have its frequency range $F_4$ extend from, say, 4.5 megaHertz up to 5.5 megaHertz.

It is an advantage to have the low frequency modulation $F_1$ as low as possible because this increases the separation from $F_2$, which makes the receiver design easier. Also, the lower the frequency $F_1$, the lower can be the bandwidth $F_3$ of the narrow band filter, which aids in the correlating enhancement of the buried test signal, as will be explained further below. A suitable frequency for $F_1$ is a very low frequency such as 10 or 20 Hertz.

In order to monitor the receiver 150 while it is in service a test correction 156 can be made at a point 157 between the limiter discriminator stages 158 and the base-band circuits 160 of the receiver. An alternate test connection 162 can be made directly into the receiver base band circuits 160. There is an isolating resistor 132 in the input connection into the broad band filter 152.

It is the purpose of the broad band filter 152 to act as a pre-selector filter so as to provide appreciable bandwidth for operation of the signal enhancing correlator circuit 170 while being sufficiently high to eliminate the modulated intelligence which is present in the base band circuits 160. Therefore, as mentioned above the lower limit of its pass band, say, 4.5 megaHertz to 5.5 megaHertz, is spaced above the upper limit, say, 4.0 megaHertz, of the base band range of frequencies.

The white noise as modulated by the two modulators 112 and 26 is buried in the receiver noise and does not interfere with the operation of this receiver 150 while it is in service.

The function of the signal enhancing correlator 170 is to extract this faint buried signal. This correlator or extractor 170 may include an amplifier stage 172, which is optional, depending upon the gain of the receiver. In most cases the gain of this receiver is sufficient to obviate the need of the amplifier 172.

Following the amplifier 172 there is a square law detector 174, the output of which feeds into a narrow band filter 154. This filter 154 has a bandwidth $\Delta F_3$ which is more than twice the frequency of the slow on-off gating $F_1$, for example the bandwidth of the filter 154 may be 50 Hertz. Its pass band is centered at the frequency $F_2$, which in this example is 200 kilo-Hertz. The test signal enhancement is proportional to the square root of the ratio of $\Delta F_4$ to $\Delta F_3$. This correlator enhancement function is expressed as follows:

$$\text{Correlator Enhancement} \cong \sqrt{(\Delta F_4/\Delta F_3)}$$

The output from the correlator circuit 170 is fed into the universal automatic noise-figure detection and indication system 30, and the meter 60 automatically indicates the noise figure of the receiver 150.

In order to explain how the buried test noise is extracted, it is noted that non-coherent ("white") noise from the source 20 can be generally represented by a continuous series of sine waves of equal amplitude but random phase, separated by $\Delta w$, where $w \to o$:

(1)
$$v_n = \sum_{w_n=-w_r}^{+w_r} v_0 \sin(w_n t + \phi_n) \Delta w$$

Figure 9:
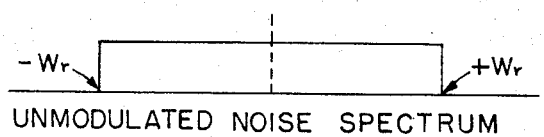
FIGS. 9, 10, 11 and 12 are plots for purposes of explanation of the operation of the buried test noise signal enhancing correlator.

In equation (1) above, $v_o$ is the voltage amplitude of each of the individual sine waves, and $v_n$ is the resulting instantaneous voltage amplitude which is occurring at each instant of time. Equation (1) relates to such "white" noise over a relatively wide band of frequencies extending from $-w_r$ to $+w_r$, and FIG. 9 shows a plot of the spectrum of such a band of noise.

If this wide band "white" noise is gated on and off by a square wave or pulse function, $f(t)$, by the high-frequency modulator 112 then the foregoing equation (1) becomes:

(2)
$$v_n = \sum_{-w_r}^{+w_r} f(t) v_0 \sin(w_n t + \phi_n) \Delta w$$

Figure 10:
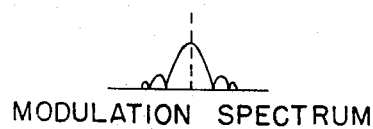
Figure 11:
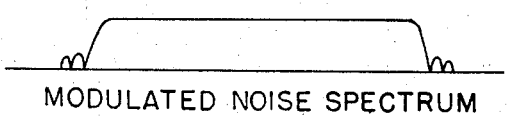

FIG. 10 shows the spectrum of the square wave modulation signal. The bandwidth of the noise whose spectrum is shown in FIG. 9 is chosen to be much wider than the range of frequencies in the modulation signal. FIG. 11 shows the spectrum of the resulting modulated noise as defined by equation (2). It is to be noted that between the same limits $-w_r$ and $+w_r$ the modulated noise spectrum retins its flat amplitude; however, the average power is reduced by the duty cycle of the on-off gating by the high frequency modulator 112.

If the square-wave modulated noise represented by equation (2) is square law detected, the following results, where $w \to o$:

(3)
$$\sum \{v_0 f(t) \sin(w_n t + \phi_n) \Delta w\}^2$$
$$= \sum_n \sum_m v_0^2 f^2(t) \sin(w_n t + \phi_n) \sin(w_m t + \phi_m)$$
$\Delta w \to o$ (4)
$$= \sum \frac{v_0^2 f^2(t)}{2} \Delta w$$
$$+ \sum_n \sum_{\substack{m \\ n \neq m}} \frac{v_0^2 f^2(t)}{2} \sin\{(w_n + w_m)t + \phi\} \Delta w_n \Delta w_m$$

Figure 12:
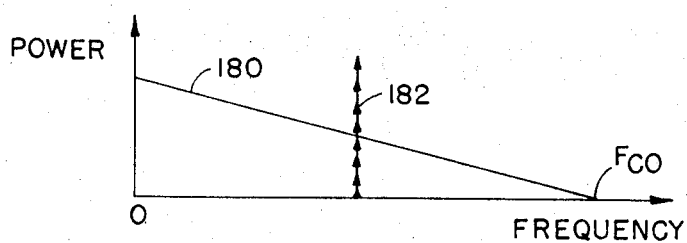

Since $f(t)$ is a pulse or square wave of unity amplitude, then $f(t) = f^2(t)$. When this wide-band modulated noise is bandlimited, as in the pre-selector filter 152 and then square-law detected, the resultant signal has a video (or baseband) spectrum as shown in FIG. 12. The continuous triangular spectrum 180 extends from Zero frequency up to the cut-off frequency $F_{co}$ of the pre-selector filter 152. This continuous triangular spectrum is a representation of the double summation ($n \neq m$) term at the right of equation (4), and it shows that the power contributed by the individual increments of the resultant signal is greatest near zero frequency and progressively decreases to zero at the cut-off frequency $F_{co}$.

The line frequency 182 occurs at the frequency $F_2$ near the center of the continuous triangular spectrum is the first term of the Fourier series of $f(t)$ whose amplitude is given by the first term ($n = m$) at the left in equation (4).

As a result of performing these steps it is seen that non-coherent, "white" noise which has a continous spectrum is transformed into line-spectral components, in which the amplitude of the line-spectral components is proportional to the summation of all the noise terms which have passed through the receiver plus a line frequency 182 at the modulation frequency $F_2$, which is the first term of the Fourier series of $f(t)$. Therefore, advantageously, as a filter 154 tuned to the line-spectrum frequency $F_2$ is narrowed, the continous spectrum unmodulated receiver noise decreases with decreasing filter bandwidth, while the line-spectrum component 22 is unaffected by the decreasing bandwidth. The use of a narrow filter thus enables extraction recovery of the gated-noise component even though the non-coherent noise in the receiver passband may be several orders of magnitude greater. The advantageous result is that the recovery ratio is equal to the square root of the ratio of pre-selector filter bandwidth $\Delta F_4$ to monitor filter bandwidth $\Delta F_3$, as expressed above.

The extracted test signal is then fed into the automatic noise-figure detection and indicator circuit 30. The extracted signal contains the low frequency modulation $F_1$, which operates to provide the noise figure reading similarly to the operation in FIGS. 1-6 and in FIG. 7.

Advantageously, this system enables continuous monitoring of the receiver performance to be carried out while the receiver is in service receiving a signal, and this monitoring can be carried out without interfering with the receiver performance.

Referring back to FIG. 7, it is noted that the system shown therein can be utilized in the same fashion as the system of FIG. 8 for continuous in service performance monitoring using buried test noise. The narrow band filter circuit 130 shown therein can serve as a test signal enhancing correlator, and the system will give accurate results, except when a significant carrier signal is present. The system of FIG. 7, unlike that shown in FIG. 8, does not have a means for separating the test noise from the received signals. Therefore, the received signals in the system of FIG. 7, if they are significant, will affect the accuracy. The detector stage in the receiver itself will serve as a square law detector, particularly so when there is no significant carrier signal present.

With reference to FIGS. 7 and 8, it is to be understood that in some instances the detector stage within the receiver can serve as a square-law detector.

Figure 13:
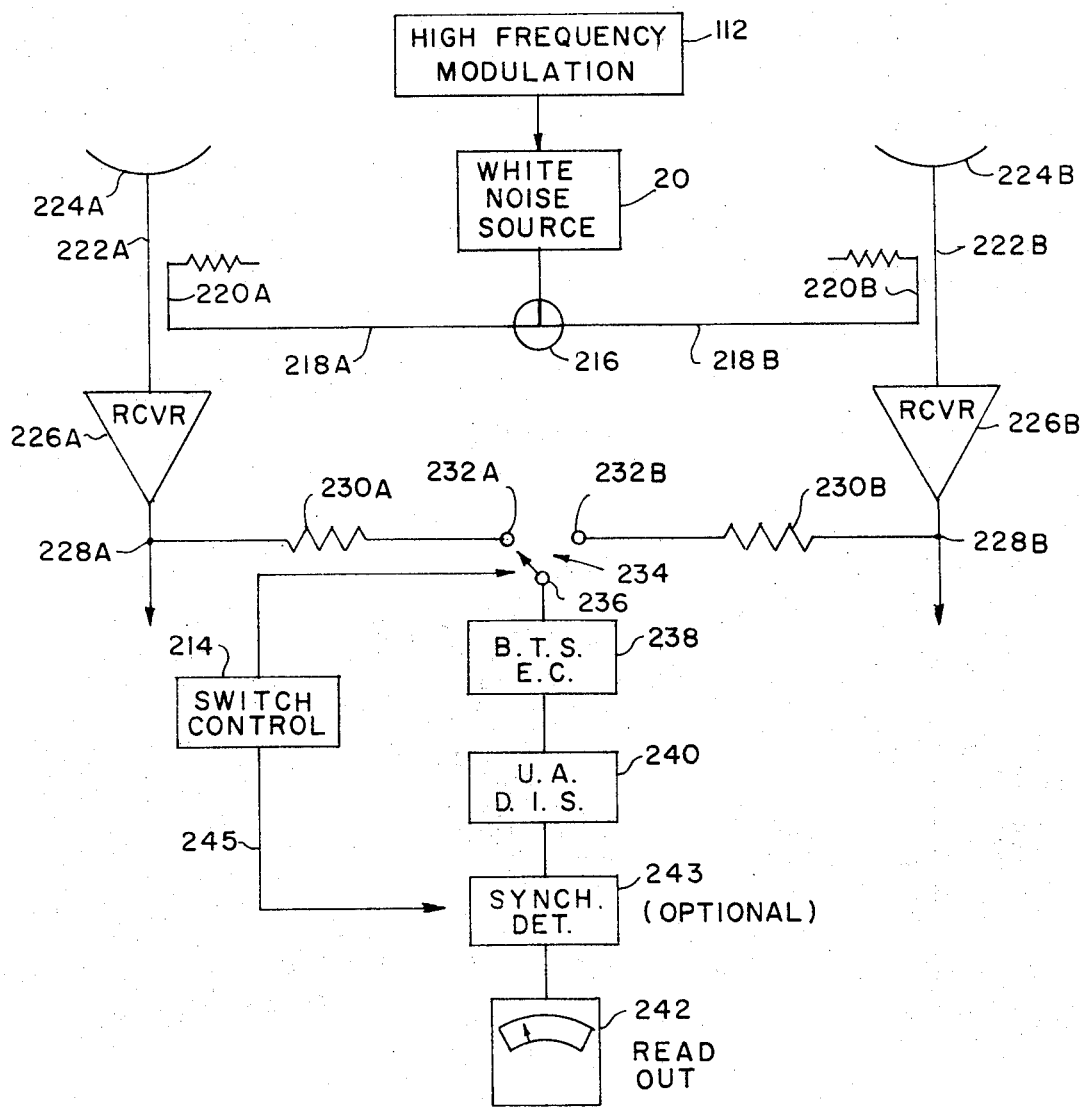
FIG. 13 is a schematic circuit diagram of a monitoring system for monitoring the gain tracking characteristics of a pair of microwave receivers.

As illustrated in FIG. 13, in the monitoring system embodying the present invention for advantageously monitoring the gain tracking of a pair of microwave receivers on a continuous, in-service basis, a white noise source 20 is modulated by a high frequency modulator 112, either sine-wave or square wave, operating at a suitable high frequency such as 1 megaHerz. The only limitation on the high frequency modulation is that it should be sufficiently high to be operatively spaced from the switching rate of a switch control 214, as will be explained. As a practical matter, the high frequency modulation should be at least 10 times the switching frequency.

The energy level of this white noise source 20 is far below the energy level of the signals being received by the antennas 224A and 224B, for example, it is 20 dB below the energy level of the received signals. Thus, the test noise is "buried" within the receivers and does not interfere with their normal operation in service.

The modulation output from the noise source 20 is divided equally by a divider 216 and is fed through similar lines 218A and 218B to a pair of unidirectional couplers 220A and 220B. These couplers 220A and 220B serve to couple the modulated noise in equal amounts into the input connections 222A and 222B leading from the respective antennas 224A and 224B into the respective receivers 226A and 226B.

At the output connections 228A and 228B (which may be at intermediate frequency or at video frequency), the signals from the respective receivers are sampled by feeding the signals through isolating resistors 230A and 230B to the terminals 232A and 232B of switching means 234 which is preferably a controllable electronic switch, although a mechanical switch could be used. Connected to an output terminal 236 of the switch means 234 is a Buried Test Signal Enhancing Correlator circuit 170 (BTSEC). This enhancing correlator circuit 170 serves the function of extracting the buried test signal so that it can be used in performing the desired gain track monitoring. The enhancing correlator circuit 170 is shown and described in detail above to which reference may be made. The circuit 170 may include an amplifying stage, but such amplifying stage is optional, depending upon the gain level of the receivers 226A and 226B. In most cases, the gain of such receivers is sufficient to obviate the need for an amplifier stage. Following the amplifier stage, if any, is a square-law detector feeding into a narrow band filter having its center frequency coinciding with the frequency of the high frequency modulator 212 and having a bandwidth which is more than twice the frequency of the switching rate of the switch control 214. As a practical matter, the frequency of the high frequency modulator 112 is at least ten times the frequency of the switching rate of the control 214.

The output from this buried test signal enhancing correlator 170 is fed into a Universal Automatic Detection and Indicator System 30 (UADIS), such as is shown and described above to which reference may be made for further information.

Briefly described, the universal automatic detection and indication system 30 includes a logarithmic voltage controlled attenuator and a fast-acting feedback loop having its input connected to the attenuator output, with the output of this feedback loop connected to the attenuator to control its level of attenuation. The read out meter 242 is responsive to the level of A.C. voltage in the feedback loop. This system 30 feeds into the read out equipment 242. A synchronous phase detector 243 may optionally be located between the system 30 and the read out equipment 242. If there is such a synchronous phase detector 243, then the switch control 214 has a lead 245 extending to it for coordinating its operation with the switch control means 214. The synchronous detector, if included, provides an indication of sense in addition to magnitude to the monitored parameter of the receivers 226A or 226B in the event there is a lack of gain tracking indicated by the read out equipment 242 which is illustratively shown as an A.C. meter. The switch control 214 serves to control simultaneously the switch means 234 and the synchronous detector circuit 243.

If the effective gain of the two receivers 226A and 226B track each other over their operating bandwidths, then the energy level of the modulated white noise arriving at the respective switch terminals 232A and 232B is the same. Accordingly, the A.C. meter 242 will indicate zero voltage component at the frequency of switching produced by the control.

On the other hand, if the effective gain of the two receivers do not track each other over their operating bandwidths, then there will be a higher energy level at one of the two switch terminals 232A or 232B; the A.C. meter will, therefore, indicate an alternating component of voltage appearing at the switching frequency.

In order to determine which receiver channel 226A or 226B has the higher effective gain, the synchronous phase detection circuit 243 may be included as discussed above which is actuated through a connection 245 from the switch control 214.

Among the advantages of this monitoring system are that the gain tracking of the respective receivers is averaged and monitored over a wide band of frequencies which is equal to the full operating bandwidths of the receivers. Also, the system is reliable and accurate in performance since its accuracy depends solely upon passive circuit elements and not upon active elements, such as amplifiers.

Although the foregoing explanation was presented in terms of a pair of receivers, it is to be understood that two, three, four, five, or any number of receivers or receiver channels can be monitored by this system. The divider 16 is arranged to feed equal amounts of the modulated white noise into the respective inputs of all of the receiver channels, and the switch 234 is switched between the output of any one of the receivers taken as a "standard of comparison" and the output of any second one of the receivers. It is then switched between the output of said one receiver and the output of any third one of the receivers, and so forth. In this way, they are each compared with the "standard" one, and so all of their respective gain tracking characteristics are monitored.

Figure 14:
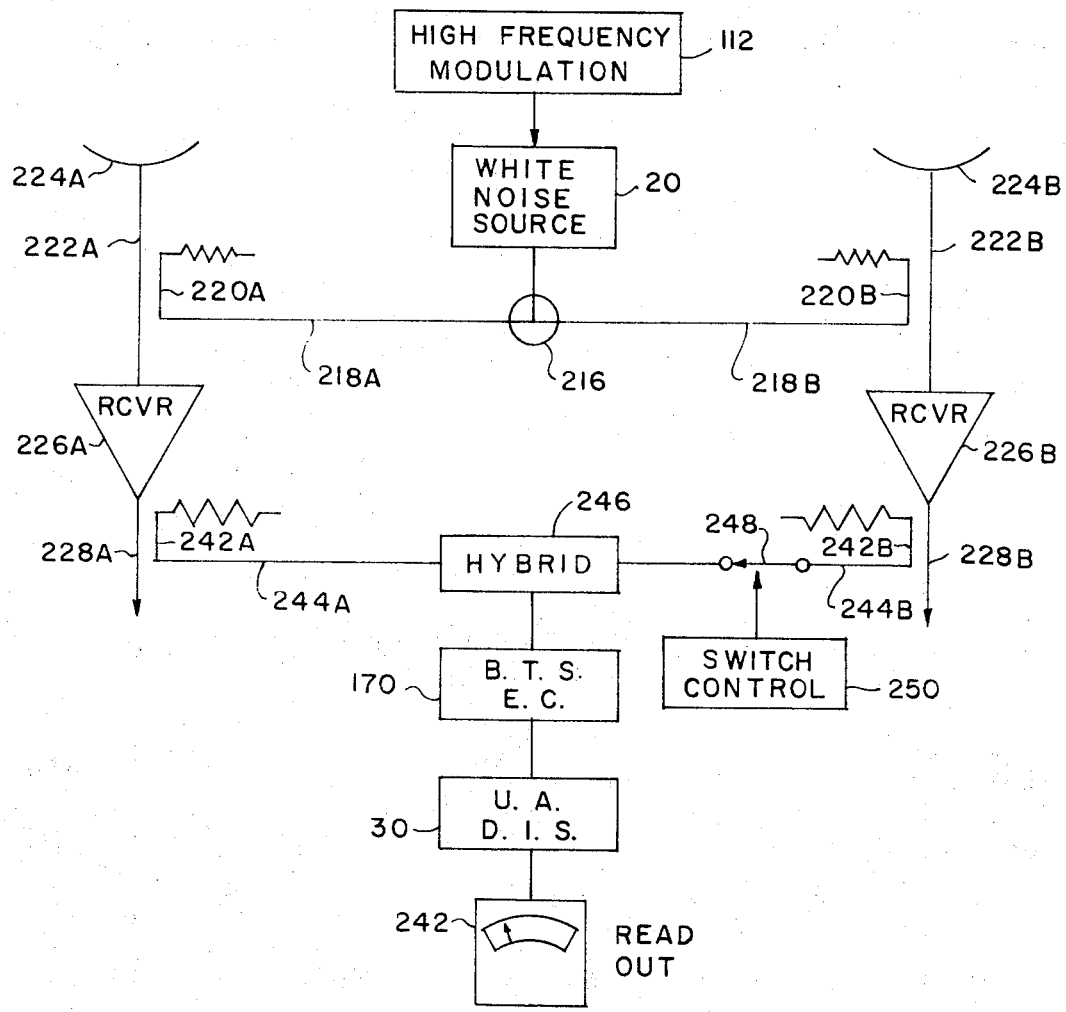
FIG. 14 is a schematic circuit diagram of a monitoring system for monitoring the phase/gain characteristics of a pair of microwave receivers.

For phase/gain tracking monitoring, a system as shown in FIG. 14 is used. This system is similar in many respects to the system of FIG. 13, and therefore only the differences will be described in detail. To maintain exactly equal phase characteristics, the lines 218A and 218B are of equal length and the two unidirectional couplers 220A and 220B are matched. The respective intermediate frequency output connections 228A and 228B from the two receivers have matched couplers 242A and 242B associated with them, and these couplers are connected through equal length lines 244A and 244B into an intermediate frequency hybrid 246. The line 244B includes calibrating switch means 248. The output from the hybrid 246 is connected into a Buried Test Signal Enhancing Correlator 170, such as described above, and its output feeds into a universal automatic detection and indication system 30 which is similar to the system as described in connection with FIG. 1 above. The read out meter 242 is responsive to the A.C. voltage level in the feedback loop of the system 40, as will be understood from a reference to FIG. 1.

In operation, the gain tracking of the receivers is first determined by the system of FIG. 13. Then, assuming that their gain does track each other, the system of FIG. 14 is used. The lower the reading of the meter 242 in FIG. 14, the more closely that the average phase of the two receivers match each other over the entire receiver band.

The switch means 248 is used as a calibrating switch. It may be automatically operated by switch control means 250 or may be manually operated. When the switch 248 is opened, there is a certain reading appearing in the meter 242. This meter reading is determined by the energy level of the modulated noise source 20. When this switch 248 is closed, the meter reading drops down toward zero. The closer that the meter reading approaches zero, the more closely that the phase of the two receivers track each other.

It is an advantage of this system of FIG. 14 that it enables the average phase tracking to be determined over the entire band of the receivers.

Advantageously, the receiver channels 226A and 226B can be continuously monitored while they are operating in service, because the buried test signal from the modulated white noise source 20 does not interfere with normal operation of the receivers. Although only two receiver channels are shown, it will be understood that the phase tracking of more than two receivers can be monitored by checking them in pairs.

Figure 15:
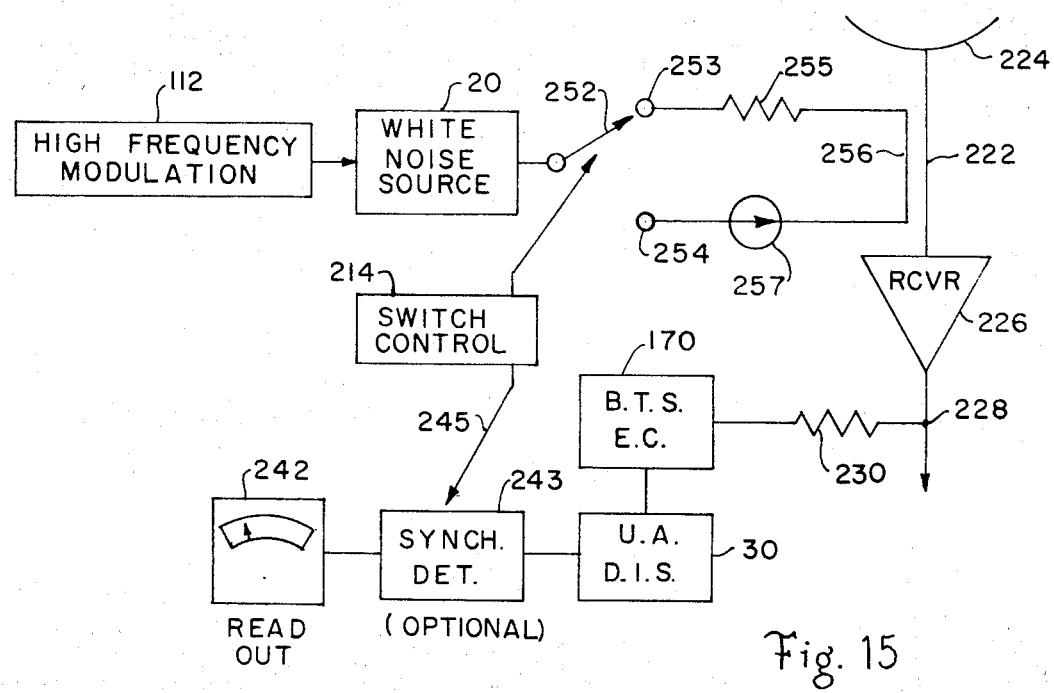
FIG. 15 is a schematic circuit diagram of a monitoring system for monitoring the antenna voltage standing wave ratio (VSWR) of an antenna and receiver installation.

In the antenna VSWR monitoring system of FIG. 15, the antenna 224 is connected through a line 222 to the receiver 226. The modulated white noise source 20 is connected through switch means 252 to either of two switch terminals 253 and 254. The terminal 253 is connected through an attenuator 255 to a unidirectional coupler 256; and the switch terminal 254 is connected through an isolator 257 to the other end of the coupler 256. The switch control 214, which is similar to the switch control shown in FIG. 13, serves to actuate the switch alternately between its output terminals 253 and 254.

When the switch completes a circuit through its terminal 254, the modulated noise voltage passes through the isolator 257 and is coupled into the antenna line 222. Voltage reflections from the antenna 224 return through the line 222 and enter the receiver input.

Conversely, when the circuit is completed through the other terminal 253, the modulated noise voltage passes through the attenuator 255 and is coupled into the line 222, so as to pass directly into the receiver input. A buried test signal enhancing correlator 238 is connected through an isolating resistor 230 to the output connection 228 from the receiver 226. A universal automatic detection and indication system 30 is connected to the output of the correlator 170, and the output of the system 30 feeds into an A.C. read out meter 242. It is optional to include a synchronous phase detector 243, as shown.

The meter 242 shows the difference in the level of the modulated noise voltage as caused by the reflection from the antenna 224 compared with the direct signal flowing through the attenuator 255. The greater the difference between these two voltage levels, the larger the reading of the meter 242. An increase in the meter reading indicates a large VSWR.

The purpose of the synchronous phase detector 243 is to avoid the possible ambiguity in reading which could occur if the modulated noise voltage as fed through the attenuating resistor 255 and through the coupler 56 into the receiver 226 were greater than the magnitude of the voltage reflected from the antenna. In such a case, an increase in meter reading would indicate a reduction in VSWR. This fact would be indicated by the synchronous phase detection circuit 243.

Figure 16:
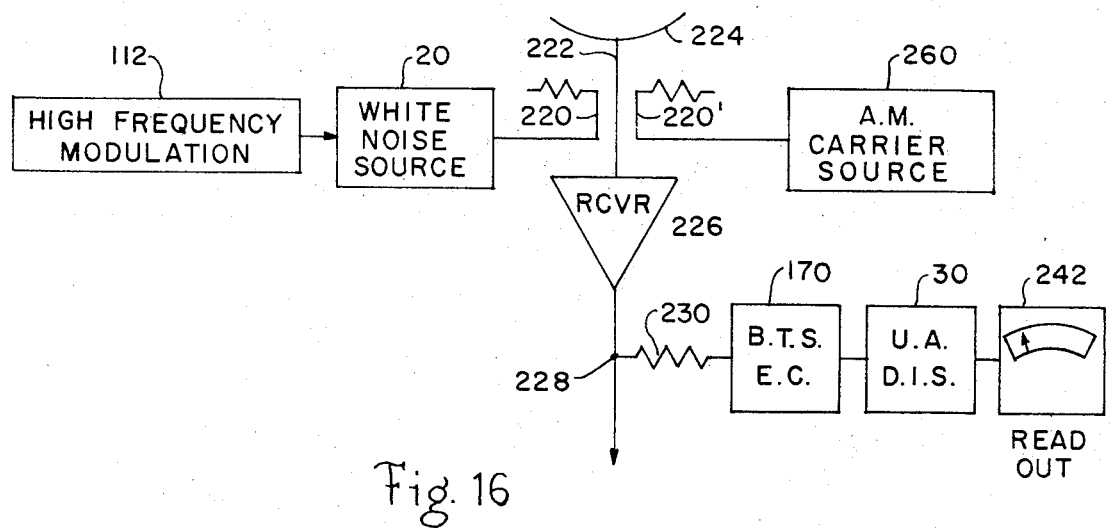
FIG. 16 is a schematic circuit diagram of a monitoring system for monitoring the amplitude non-linearity of a receiver.

In the monitoring system of FIG. 16, the amplitude non-linearity of the receiver 226 is monitored. The modulated noise signals from the source 20 are coupled into the antenna line 222 through the unidirectional coupler 220. In addition, an amplitude modulated carrier source 260 is coupled through a similar unidirectional coupler 220' into the antenna line 222. The source 260 has a fixed amount of amplitude modulation, preferably it provides a 100% amplitude modulated carrier signal whose frequency is tuned away from the band pass of the receiver 226, so that it will not interfere with the receiver as it is in operation.

If there is any amplitude non-linearity in the receiver 226, the effect will be to transfer the AM modulation to the low level voltage from the test source 20, i.e. "cross-talk" between the two signals will occur. The amount of amplitude modulation which is transferred to the noise is measured by feeding the output signals through an isolating resistor 230 to a buried test signal enhancing correlator 170 connected to a universal automatic detection and indication system 30 having a read out meter 242, which is an A.C. meter. The greater the meter reading, the greater is the amplitude non-linearity of the receiver 226.

Figure 17:
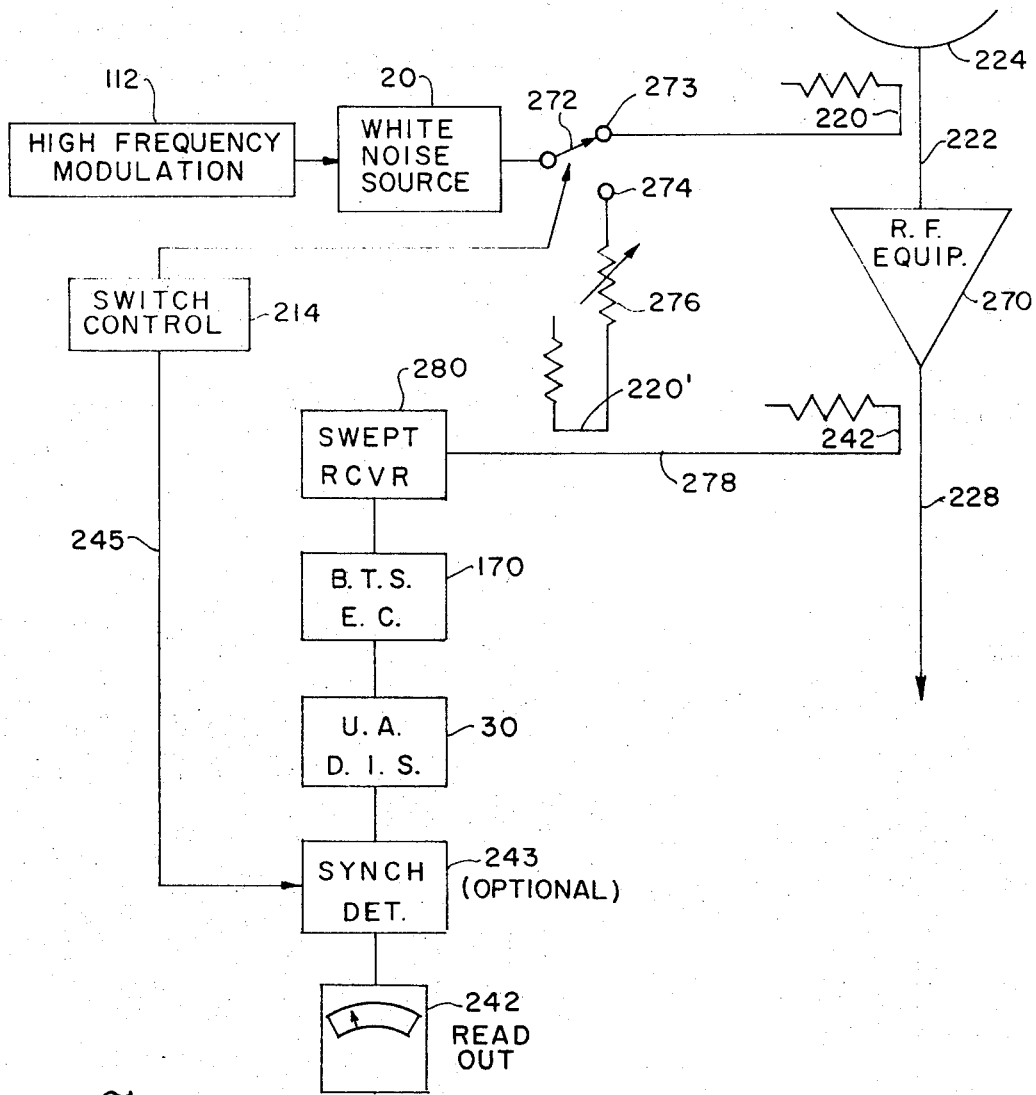
FIG. 17 is a schematic circuit diagram of a monitoring system for monitoring the R.F. gain and transmission flatness of R.F. equipment having the same input and output frequency.

In FIG. 17 is shown a system for continuously monitoring in service the R.F. gain and transmission flatness of R.F. equipment 270, for example, such as a parametric amplifier. In operation, the switch means 272 is switched between the terminal 273 which is connected to a directional coupler 220 feeding into the input line 222 and another switch terminal 274 which is connected through an adjustable attenuator 276 to a directional coupler 220' feeding into a line 278. This line 278 extends between a directional coupler 242 associated with the output connection 228 from the R.F. equipment 270 and a swept receiver 280. The output from this swept receiver feeds into a read-out system which is similar to that shown in FIG. 13 and, therefore, need not be described again.

In this embodiment of the invention, the gain and other transmission characteristics of the R.F. equipment can advantageously be checked over the band of operation of the equipment 270 on a continuous in-service basis without interfering with the normal operation of the equipment 270. The monitoring measurements are dependent for their accuracy only on passive elements, namely, the three directional couplers 220, 220' and 242 and the adjustable attenuator 276. Variations in the output of the modulated white noise source 20 or in the swept receiver 280, or in the read-out circuits 170, 30, 243 and 242 unit, affect the accuracy of the monitoring measurements. By virtue of the fact that the modulated white noise source 20 supplies an infinite number of incoherent sine waves of constant amplitude uniformly spread over the frequency band of operation, the transmission characteristics of the R.F. equipment 270 can be checked using a swept receiver. There is no need to use a swept frequency source feeding into the input 222.

The attenuator 276 is adjusted until the meter reading is zero as the switch 272 is switched back and forth between the alternate contacts 273 and 274, i.e. there is no A.C. signal appearing at the read out meter 242 at the switching frequency. When this adjustment has been made, the setting of the attenuator 276 is equal to the amount of gain of the equipment 270 at the particular frequency to which the swept receiver 270 has been adjusted. Normally, the attenuator 276 is set to give the zero reading at the nominal mid-band frequency of the R.F. equipment 270. If the reading of the meter 242 begins to change, then this change indicates a change in gain of the R.F. equipment 270 being monitored, and corrective steps can be taken if needed.

In order to monitor transmission flatness, the receiver 280 is slowly swept over the frequency range of R.F. equipment 270 at a rate which is slow relative to the switching rate frequency of the switch 272. If the gain of the R.F. equipment 270 varies over its pass band, this variation will show up as a change in reading of the meter 242. The swept receiver 80 can be tuned by hand. If it is automatically swept in frequency, then it is convenient to use an oscilloscope as the read out device in lieu of the meter 242. In this way the scope will present a graphic picture of the flatness of the R.F. equipment 270 over its pass band.

It is noted in all cases (except one) that the square-law detector 174 in the buried test signal enhancing correlator 170 can be omitted if the receiver itself contains a detector which has square-law detection characteristics. The one exception is FIG. 14, in which the square-law detector must be included in the correlator 170 following the hybrid 246 because the hybrid is phase sensitive.

It is preferred that the read out means 242 be tuned to the switching frequency, because this provides additional sensitivity.

What is claimed is:

1. Automatic noise-figure indication test apparatus for testing receiver equipment comprising a logarithmic voltage-controlled attenuator having input and output connections and also having a control connection for providing an attenuation between said input and output connections which is a logarithmic function of the D.C. component of voltage applied to said control connection, means for connecting said input connection of the attenuator to the receiver to be tested, a fast-acting automatic gain control feedback loop which is connected from said output connection of the attenuator to said control connection of the attenuator for keeping the attenuator output constant, said fast-acting A.G.C. loop being sufficiently fast to follow the changes in the root mean square value of noise voltage, and read out means in said apparatus connected to said control connection and responsive to the level of the alternating voltage in said control connection for providing information as to the receiver noise figure.

2. A system for test monitoring receiver equipment comprising a noise source, a low frequency modulator for gating said noise source on-and-off at a predetermined frequency $F_1$, means for connecting said noise source to the receiver input, a logarithmic voltage-controlled attenuator having input and output connections and also having a control connection for porviding an attenuation between said input and output connections which is a logarithmic function of the D.C. component of voltage applied to said control connection, means for connecting said input connection of the attenuator to the receiver to be tested, a fast-acting automatic gain control feedback loop which is connected from said output connection of the attenuator to said control connection of the attenuator for keeping the attenuator output constant, said fast-acting A.G.C. loop being sufficiently fast to follow the changes in the root mean square value of noise voltage, and read out means in said apparatus connected to said control connection and responsive to the level of the alternating voltage in said control connection for providing information as to the receiver noise figure.

3. A system for test monitoring receiver equipment of the crystal video type and of the AM type while the receiver is on-line comprising a noise source, a high frequency modulator for modulating the noise source at a high frequency $F_2$, a low frequency modulator for gating the modulated noise source on-and-off at a low frequency $F_1$, where $F_2$ is preferably at least 10 times $F_1$, means for connecting said modulated noise source to the receiver input, a logarithmic voltage-controlled attenuator having input and output connections and also having a control connection for providing an attenuation between said input and output connections which is a logarithmic function of the D.C. component of voltage applied to said control connection, means for connecting said input connection of the attenuator to the receiver to be tested at a point in said receiver after the detector stage of the receiver, square law detection means associated with said system and being includable in the receiver to be tested, a fast-acting automatic gain control feedback loop which is connected from said output connection of the attenuator to said control connection of the attenuator for keeping the attenuator output constant, said fast-acting A.G.C. loop being sufficiently fast to follow the changes in the root mean square value of noise voltage, and read out means in said apparatus connected to said control connection and responsive to the level of the alternating voltage in said control connection for providing information as to the receiver noise figure.

4. A monitoring system for monitoring receivers while the receivers are on-line in actual service utilizing test noise wherein the test noise is introduced at an energy level substantially below the receiver noise energy level so as not to interfere with the normal operation of the receiver comprising a noise source, a high frequency modulator for modulating the noise source at a high frequency $F_2$, a low frequency modulator for gating the modulated noise source on-and-off at a low frequency $F_1$, where $F_2$ is preferably at least 10 times $F_1$, means for connecting said modulated noise source to the receiver input, said monitoring system including means for providing square-law detection, said square law detection means being includable in the receiver or in the test system, a narrow band filter connected in circuit after said square-law detection means and in circuit with the receiver, said narrow band filter having a bandwidth more than twice $F_1$, a logarithmic voltage-controlled attenuator having input and output connections and also having a control connection for providing an attenuation between said input and output connections which is a logarithmic function of the D.C. component of voltage applied to said control connection, said attenuator having its input connected in circuit with said narrow band filter, a fast-acting automatic gain control feedback loop which is connected from said output connection of the attenuator to said control connection of the attenuator for keeping the attenuator output constant, said fast-acting A.G.C. loop being sufficiently fast to follow the changes in the root mean square value of noise voltage, and read out means in said apparatus connected to said control connection and responsive to the level of the alternating voltage in said control connection for providing information as to the receiver noise figure.

5. A monitoring system for monitoring receivers while the receivers are on-line in actual service utilizing test noise wherein the test noise is introduced at an energy level substantially below the receiver noise energy level so as not to interfere with the normal operation of the receiver and said monitoring system being capable of accurately performing its monitoring function in the presence of strong signals being received having a predetermined frequency spectral characteristic comprising a noise source, a high frequency modulator for modulating the noise source at a high frequency $F_2$, a low frequency modulator for gating the modulated noise source on-and-off at a low frequency $F_1$, where $F_2$ is preferably at least ten times $F_1$, means for connecting said modulated noise source to the receiver input, said monitoring system including means for providing square-law detection, said square law detection means being includable in the receiver or in the test system, a broad band filter connected to the receiver and tuned to a range of frequencies displaced from the frequency sectral characteristics of the strong signals being received, said broad band filter having a bandwidth more than twice $F_2$, a narrow band filter connected in circuit after said square law detection means and also after said broad band filter, said narrow band filter having a bandwidth more than twice $F_1$, a logarithmic voltage-controlled attenuator having input and output connections and also having a control connection for providing an attenuation between said input and output connections which is a logarithmic function of the D.C. component of voltage applied to said control connection, said attenuator having its input connected in circuit with said narrow band filter, a fast-acting automatic gain control feedback loop which is connected from said output connection to said control connection of the attenuator for keeping the attenuator output constant, said fast-acting A.G.C. loop being sufficiently fast to follow the changes in the root mean square value of noise voltage, and read out means in said apparatus connected to said control connection and responsive to the level of the alternating voltage in said control connection for providing information as to the receiver noise figure.

6. Automatic noise-figure indication test apparatus for testing receiver equipment comprising a logarithmic voltage-controlled attenuator having input and output connections and also having a control connection for providing an attenuation between said input and output connections which is a logarithmic function of the D.C. component of voltage applied to said control connection, means for connecting said input connection of the attenuator to the receiver to be tested, a fast-acting automatic gain control feedback loop which is connected from said output connection of the attenuator to said control connection of the attenuator for keeping the attenuator output constant, said fast-acting A.G.C. loop being sufficiently fast to follow the changes in the root means square value of noise voltage, a slow-acting A.G.C. loop responsive to the output from said attenuator and connected to a point in said test apparatus ahead of said input connection of the attenuator, and read out means in said apparatus connected to said control connection and responsive to the level of the alternating voltage in said control connection for providing information as to the receiver noise figure.

7. A parameter monitoring system for continuously monitoring the performance of receiver parameters while the receiver is in service comprising a white noise source, a modulator associated with said noise source for modulating the output of said noise source, coupling means for coupling the output of said modulated noise source into the receiver input, a logarithmic voltage controlled attenuator, means for connecting the attenuator to the receiver to be tested, a fast-acting automatic gain control feedback loop which is connected to the attenuator for keeping the attenuator output constant, said fast-acting A.G.C. loop being sufficiently fast to follow the changes in the root means square value of noise, and read out means connected to said feed-back loop and responsive to the level of the alternating voltage in said feedback loop for providing information as to the receiver performance.

8. A parameter monitoring system as claimed in claim 7, in which the receiver includes a pair of receiver channels each having input connections and output connections, a divider is connected to the output from said modulated noise source, said coupling means includes a pair of couplers in circuit between said divider and the respective input connections of said pair of receiver channels, and switch means is included for periodically feeding energy from the output connections of the respective channels to said attenuator for monitoring the gain tracking of said pair of channels over a wide band of frequencies equal to the full operating band width of the receiver channels.

9. A parameter monitoring system as claimed in claim 7, in which the receiver includes a plurality of receiver channels each having input connections and output connections, said coupling means includes a plurality of couplers in circuit between said divider and all of the respective input connections, second coupling means is connected to all of the respective output connections of the respective receivers, and said switch means is periodically switched between the output connection for one of said channels chosen as a "standard" and the output connection from the other channels in turn for comparing the performance of the other channels with said "standard" channel.

10. A monitoring system for continuously monitoring the performance of receiver system parameters while the receiver system is in service comprising a white noise source, a high frequency modulator associated with said noise source for modulating the output of said noise source at a high frequency, first circuit means for feeding the energy output from said modulated noise source into the receiver system input, second circuit means for feeding energy from the receiver output, switch means in one of said circuit means for periodically interrupting said one circuit means at a predetermined switching rate, said high frequency being sufficiently high to be operatively spaced from the switching rate of said switching means and preferably at least 10 times said switching rate, a logarithmic voltage controlled attenuator, said second circuit means connecting the attenuator to the receiver to be tested, a fast-acting automatic gain control feedback loop which is connected to the attenuator for keeping the attenuator output constant, said fast-acting A.G.C. loop being sufficiently fast to follow the changes in the root means square value of noise, and read out means in said apparatus connected to said feedback loop and responsive to the level of the alternating voltage in said feedback loop for providing information as to the receiver performance.

11. A system for continuously monitoring the gain tracking performance of a plurality of receiver channels while the receiver channels are in normal service without significantly interfering with their normal service comprising a white noise source, a high frequency modulator associated with said white noise source for modulating the output of said noise source at a high frequency $F_2$, first coupling means for injecting the modulated white noise at substantially equal energy levels into the inputs of a plurality of said receiver channels, second coupling means and switch means associated with the respective outputs of the plurality of receiver channels, said switch means having a switching rate $F_1$ which is operatively spaced from said high frequency $F_2$ and preferably at least one-tenth of $F_2$, said switch means serving to switch between a predetermined pair of the respective outputs for feeding energy therefrom into the square-law detector, a narrow band filter connected to said switch means, said narrow band filter having its pass band centered at the frequency $F_2$ and having a pass-band width at least twice $F_1$, square-law detection means preceding said narrow band filter and preferably being included in each receiver channel, a logarithmic voltage controlled attenuator connected to said narrow band filter, a fast-acting automatic gain control feedback loop which is connected to the attenuator for keeping the attenuator output constant, said fast-acting A.G.C. loop being sufficiently fast to follow the changes in the root mean square value of the modulated white noise from said noise source, and read out means in said monitoring system connected to said feedback loop and responsive to the level of the alternating voltage in said feedback loop for providing information as to the gain tracking of said receiver channels.

12. A system for continuously monitoring the gain tracking performance of a plurality of receiver channels as claimed in claim 11, in which said read out means is preferably narrow band responsive and is tuned to be responsive at the switching rate $F_1$.

13. A system for continuously monitoring the gain tracking performance of a plurality of receiver channels as claimed in claim 11, in which synchronous detection means is included in said system associated with said read out means and is controlled in accordance with the switching of said switching means.

14. A performance monitoring system for continuously monitoring the phase tracking of a plurality of receiver channels while the receiver channels are in normal service without significantly interfering with their normal service comprising a white noise source, a high frequency modulator associated with said white noise sourcefor modulating the output of said white noise source at a high frequency $F_2$, first coupling means of equal effective electrical length for injecting the modulated white noise into the inputs of a plurality of said receiver channels at the same energy level and also at the same phase, a hybrid and second coupling means associated with the outputs of said receiver channels for coupling said hybrid to a predetermined pair of said outputs, a narrow band filter arranged to receive energy from the output of said hybrid, said narrow band filter having its pass-band center frequency at the frequency $F_2$, said monitoring system including means for providing square-law detection located ahead of said narrow band filter, said square-law detection means being located in said monitoring system ahead of said narrow band filter and behind said hybrid, a logarithmic voltage controlled attenuator connected to said narrow band filter, a fast-acting automatic gain control feedback loop which is connected to the attenuator for keeping the attenuator output constant, said fast acting A.G.C. loop being sufficiently fast to follow the changes in the root means square value of the modulated white noise from said noise source, and read out means in said monitoring system connected to said feedback loop and responsive to the level of the alternating voltage in said feedback loop for providing information as to the phase tracking of said receiver channels.

15. A performance monitoring system for continuously monitoring the phase tracking of a plurality of receiver channels as claimed in claim 14, in which said read out means is preferably narrow band responsive and is tuned to be responsive at the switching rate $F_1$.

16. A performance monitoring system for continuously monitoring the phase tracking of a plurality of receiver channels as claimed in claim 14, in which synchronous detection means is included in said system associated with said read out means and is controlled in accordance with the switching of said switching means.

17. A monitoring system for continuously monitoring the antenna voltage standing wave ratio (VWSR) of a receiver while the receiver is in normal service without significantly interfering with the normal service of the receiver, comprising a white noise source, a high frequency modulator associated with said noise source for modulating the output of said noise source at a high frequency $F_2$, directional coupling means associated with the input line extending from the antenna to the receiver for injecting energy into the input line after the antenna, an attenuator connected to one port of said coupling means, an isolator connected to the other port of said coupling means, switch means between said modulated noise source and said attenuator and isolator and being switchable back and forth between a first and a second condition, said switch means in said first condition feeding modulated white noise through said attenuator and through said directional coupling means into the input line in a direction toward the receiver, said switch means in said second condition feeding modulated white noise through said isolator and through said coupling means into the input line in a direction toward the antenna so as to be reflected by the antenna back toward the receiver, second coupling means associated with the receiver output, a narrow band filter arranged to receive energy from the second coupling means, said monitoring system including means for providing square-law detection located ahead of said narrow band filter and preferably in the receiver, a logarithmic voltage controlled attenuator connected to said narrow band filter, a fast-acting automatic gain control feedback loop which is connected to the attenuator for keeping the attenuator output constant, said fast-acting A.G.C. loop being sufficiently fast to follow the changes in the root mean square value of the modulated white noise from said noise source, and read out means in said monitoring system connected to said feedback loop and responsive to the level of the alternating voltage in said feedback loop for continuously providing information as to the antenna VSWR within the bandwidth of the receiver.

18. A monitoring system for antenna VSWR as claimed in claim 17, in which said read out means is preferably narrow band responsive and is tuned to be responsive at the switching rate $F_1$.

19. A monitoring system for antenna VSWR as claimed in claim 17, in which synchronous detection means is included in said system associated with said read out means and is controlled in accordance with the switching of said switch means.

20. A monitoring system for antenna VSWR as claimed in claim 17, in which said receiver is tunable in frequency and the claimed system enables the antenna VSWR to be measured at different frequencies by tuning the receiver to such frequencies.

21. A performance monitoring system for continuously monitoring the amplitude non-linearity in a receiver as caused by the undesired interaction in the receiver by two signals of different frequency, said monitoring system being operable while the receiver is in normal service without significantly interfering with the normal service thereof comprising a white noise source, a high frequency modulator associated with the noise source for modulating the output of said noise source at a high frequency $F_2$, first coupling means for injecting the modulated white noise into the receiver input, means for producing a carrier signal of fixed frequency and for varying the amplitude of said carrier signal, said carrier signal having a frequency which is tuned away from the operating pass-band of the receiver, second coupling means for injecting said carrier signal of varying amplitude into the receiver input, third coupling means associated with the receiver output, a narrow band filter arranged to receive energy from said third coupling means, square-law detection means in said system ahead of said narrow band filter and preferably included in the receiver being monitored, a logarithmic voltage controlled attenuator connected to said narrow band filter, a fast-acting automatic gain control feedback loop which is connected to the attenuator for keeping the attenuator output constant, said fast acting A.G.C. loop being sufficiently fast to follow the changes in the root mean square value of the modulated white noise from said noise source, and read out means in said monitoring system connected to said feedback loop and responsive to the level of the alternating voltage in said feedback loop for providing information as to the amplitude non-linearity of said receiver.

22. A performance monitoring system as claimed in claim 21, in which said read out means is preferably narrow band responsive and is tuned to be responsive at the switching rate $F_1$.

23. A monitoring system for continuously monitoring a parameter of a medium through which radio frequency energy can be transmitted comprising a white noise source, means for feeding noise energy from said source through the medium to be monitored, means for changing the noise source back and forth between first and second conditions, a logarithmic controllable attenuator, means for connecting said attenuator to receive the noise energy which has passed through said transmission medium, a fast-acting automatic gain control feedback loop connected to said attenuator to keept the attentuator output effectively constant, said fast-acting A.G.C. loop being sufficiently fast to follow the changes in root mean square value of the noise energy, and read out means coupled to said A.G.C. loop and indicating the ratio of the levels of the signals in said A.G.C. loop under said first and second conditions, respectively.

* * * * *